United States Patent
Watanabe

(10) Patent No.: US 6,784,934 B1
(45) Date of Patent: Aug. 31, 2004

(54) ACTIVE TYPE SOLID-STATE IMAGING DEVICE WITH REDUCED PIXEL LEAK CURRENT

(75) Inventor: Takashi Watanabe, Souraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/496,076

(22) Filed: Feb. 1, 2000

(30) Foreign Application Priority Data

Feb. 24, 1999 (JP) .......................................... 11-046187

(51) Int. Cl.$^7$ .......................... H04N 3/14; H04N 5/335; H01L 27/00; H01L 31/062; H01L 31/113
(52) U.S. Cl. ..................... 348/308; 250/208.1; 257/291
(58) Field of Search .............................. 348/222.1, 296, 348/301, 302, 303, 304, 305, 306, 307, 308, 309, 310, 313, 314; 250/208.1; 257/291

(56) References Cited

U.S. PATENT DOCUMENTS

| | | | | |
|---|---|---|---|---|
| 4,482,985 A | * | 11/1984 | Itoh et al. | 257/299 |
| 5,220,587 A | | 6/1993 | Takemoto et al. | 377/57 |
| 5,659,264 A | * | 8/1997 | Ariyoshi et al. | 327/513 |
| 5,912,483 A | * | 6/1999 | Hamada | 257/239 |
| 6,031,571 A | * | 2/2000 | Arakawa | 348/316 |
| 6,043,525 A | * | 3/2000 | Chen | 257/292 |
| 6,211,510 B1 | * | 4/2001 | Merrill et al. | 348/302 |
| 6,242,728 B1 | * | 6/2001 | Merrill et al. | 250/208.1 |
| 6,410,899 B1 | * | 6/2002 | Merrill et al. | 250/208.1 |
| 6,493,030 B1 | * | 12/2002 | Kozlowski et al. | 348/310 |
| 6,618,083 B1 | * | 9/2003 | Chen et al. | 348/308 |
| 6,674,471 B1 | * | 1/2004 | Masuyama | 348/302 |
| 6,677,993 B1 | * | 1/2004 | Suzuki et al. | 348/302 |
| 6,690,000 B1 | * | 2/2004 | Muramatsu et al. | 250/208.1 |

FOREIGN PATENT DOCUMENTS

| | | | | |
|---|---|---|---|---|
| EP | 0 928 101 A2 | | 7/1999 | |
| JP | 11264761 A | * | 9/1999 | G01J/1/44 |

OTHER PUBLICATIONS

"A¼ Inch 330k Pixel VGA CMOS Image Sensor," Keiji Mabuchi, el al. ITE Technical Report, vol. 21, No. 21,IPU97–13, CE97–5, (Mar. 1997), pp. 25–30.

* cited by examiner

Primary Examiner—Wendy R. Garber
Assistant Examiner—John M. Villecco
(74) Attorney, Agent, or Firm—David A. Tucker; Edwards & Angell, LLP

(57) ABSTRACT

An active type solid-state imaging device of the present invention includes: a plurality of pixels arranged in an array; a plurality of signal lines wherein each of the pixels is connected to one of the signal lines; a first power source; and a second power source having a lower voltage than that of the first power source. Each of the pixels includes: a photoelectric conversion section; a first, depletion type MOS transistor; a second, reset MOS transistor for resetting a signal charge which has been stored in the photoelectric conversion section; and a third, pixel selection MOS transistor serially connected to the first MOS transistor to form a transistor pair. One end of the transistor pair is connected to one of the signal lines and the other end thereof is connected to the first power source. One end of the second MOS transistor is connected to the photoelectric conversion section and the other end thereof is connected to the second power source.

5 Claims, 5 Drawing Sheets

PRIOR ART

US 6,784,934 B1

ACTIVE TYPE SOLID-STATE IMAGING DEVICE WITH REDUCED PIXEL LEAK CURRENT

BACKGROUND OF THE INVENTION

1. Field of the Invention

The present invention relates to a circuit technology for reducing the pixel leak current of an active type solid-state imaging device.

2. Description of the Related Art

Various active type solid-state imaging devices have been proposed in the art in which each pixel is provided with an amplification function, and a scanning circuit is used to read a signal amplified by the pixel. One of such active type solid-state imaging devices is an APS (Active Pixel Sensor) type image sensor which employs a CMOS device for each pixel. The use of a CMOS device is advantageous in integrating the pixel configuration with the peripheral units such as a driving circuit and a signal processing circuit. An APS typed image sensor requires a photoelectric conversion section, an amplification section, a pixel selection section, and a reset section to be provided in each pixel. Thus, an APS type image sensor typically uses, for each pixel, one photoelectric conversion section formed of a photo diode (PD) and three or four MOS transistors (T).

FIG. 5 shows a configuration of a two-dimensional area image sensor employing the conventional PD+3T pixel configuration (Mabuchi, et. al., "A ¼ Inch 330 k Pixel VGA CMOS Image Sensor", The Technical Report of Institute of Image Information and Television Engineers, IPU97-13, March, 1997).

Referring to FIG. 5, each pixel includes a photoelectric conversion photo diode 5, an amplification MOS transistor 1, a reset MOS transistor 2, a pixel selection MOS transistor 3, a pixel selection clock line 11, a reset clock line 12, a signal line 13 and a power source line 14.

The MOS transistor 3 is driven by a vertical scanning circuit (I) 20 through the pixel selection clock line 11, and the MOS transistor 2 is driven by another vertical scanning circuit (II) 21 through the reset clock line 12. A MOS transistor 15 (the gate bias voltage is shown as $V_{L1}$) is connected to the signal line 13 as a load for supplying a constant current. The output voltage of the MOS transistor 15 is eventually passed to a horizontal signal line 19 through an amplifier (an amplification MOS transistor) 16 and a MOS transistor 17. The MOS transistor 17 is driven by a horizontal scanning circuit 22 through a horizontal clock line 18. A MOS transistor 23 (the gate bias voltage is shown as $V_{L2}$) is connected to the horizontal signal line 19 as a load for supplying a constant current. The output voltage of the horizontal signal line 19 is led to an output terminal OS through an amplifier 24.

In FIG. 5, the MOS transistors 1, 2, and 3 are all n-type enhancement MOS transistors, and the photo diode 5 is a pn junction diode. With this configuration, it is easy to form the pixels by an ordinary CMOS process. The peripheral circuits (including the analog circuits such as the amplifiers 16 and 24 and the digital circuits such as the vertical scanning circuits 20 and 21 and the horizontal scanning circuit 22) are typically CMOS circuits. Therefore, it is possible to form both the pixels and the peripheral circuits in a common process. Thus, the pixels and the periphery circuits can be commonly connected to a single power source (e.g., $V_D$).

In the configuration shown in FIG. 5, all the transistors 1, 2, and 3 are n-type enhancement MOS transistors.

Therefore, the input/output characteristic of a source follower circuit which includes the amplification MOS transistor 1 and the MOS transistor 15 as a load for supplying a constant current will be as shown in FIG. 6. In FIG. 6, $V_{T1}$ is the threshold voltage of the amplification MOS transistor 1, $V_{T2}$ is the threshold voltage of the MOS transistor 15 as a load for supplying a constant current, and $V_L$ is the gate bias voltage of the MOS transistor 15. For an output voltage $v_o$ within the range:

$$v_o > V_L - V_{T2},$$

the MOS transistor 15 as a load for supplying a constant current is saturated, thus ensuring linearity of the input/output relationship. Therefore, a sufficient operational margin cannot be obtained unless the input voltage $v_i$ is at a high level near the source voltage $V_D$.

In the configuration shown in FIG. 5, the pn junction diode forming the photoelectric conversion photo diode 5 is reversely biased to the magnitude of the voltage $V_D$ by resetting the photo diode 5 to the magnitude of the source voltage $V_D$. A leak current may occur in the pn junction diode due to the reverse bias. In such a case, the leak current is accumulated during each photo carrier charging period and added to the signal charge, thus generating a false signal. The amount of the leak current varies among different pixels, thereby causing fixed-pattern noise in the displayed image. A localized leak current may generate a white defect. Therefore, the leak current may significantly degrade the image quality.

The amount of leak current generated in the pn junction diode is strongly dependent on the magnitude of the reverse bias voltage, and rapidly increases as shown in FIG. 7 as the reverse bias voltage increases. Therefore, it is necessary to reduce the reverse bias voltage, and hence the source voltage, in order to reduce the amount of leak current generated in the pn junction diode. This, however, leads to the reduction of the operational margin as shown in FIG. 6. The trade-off relationship has been a significant problem in APS type CMOS image sensors.

SUMMARY OF THE INVENTION

According to one aspect of this invention, an active type solid-state imaging device includes: a plurality of pixels arranged in an array; a plurality of signal lines wherein each of the pixels is connected to one of the signal lines; a first power source; and a second power source having a lower voltage than that of the first power source. Each of the pixels includes: a photoelectric conversion section; a first, depletion type MOS transistor: a second, reset MOS transistor for resetting a signal charge which has been stored in the photoelectric conversion section; and a third, pixel selection MOS transistor serially connected to the first MOS transistor to form a transistor pair. One end of the transistor pair is connected to one of the signal lines and the other end thereof is connected to the first power source. One end of the second MOS transistor is connected to the photoelectric conversion section and the other end thereof is connected to the second power source.

In one embodiment of the invention, the second MOS transistor and the third MOS transistor are of a depletion type.

In one embodiment of the invention, each of the signal lines is connected to a signal processing circuit driven by the first power source.

In one embodiment of the invention, the second power source includes the first power source and a voltage dividing circuit for dividing the voltage of the first power source.

In one embodiment of the invention, the voltage dividing circuit includes a voltage follower circuit.

In one embodiment of the invention, the voltage dividing circuit includes a circuit having one or more diodes connected together in a forward direction.

In the active type solid-state imaging device according to the present invention, the reverse bias voltage applied to the pn junction diode as a light detecting section is set to be lower than the source voltage which is necessary for signal reading operations. Therefore, the amount of leak current generated in the light detecting section is greatly reduced. Furthermore, according to the present invention, by using a depletion type transistor for a signal amplification MOS transistor, a sufficient operational margin is ensured even if the reverse biased voltage applied to the pn junction diode is low.

Thus, the invention described herein makes possible the advantage of providing a novel active type solid-state imaging device having a very simple configuration in which the amount of leak current generated in a pn junction diode is reduced and a sufficient operational margin can be ensured.

This and other advantages of the present invention will become apparent to those skilled in the art upon reading and understanding the following detailed description with reference to the accompanying figures.

Figure 4A:
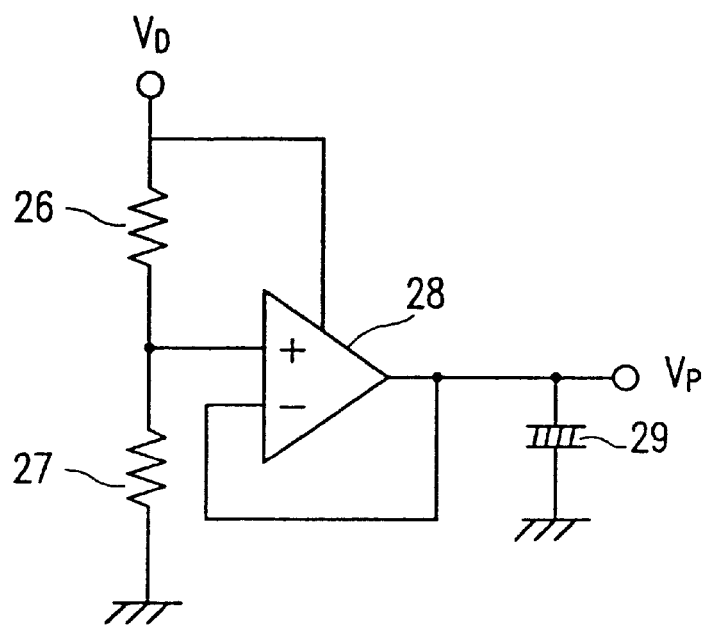
Figure 4B:
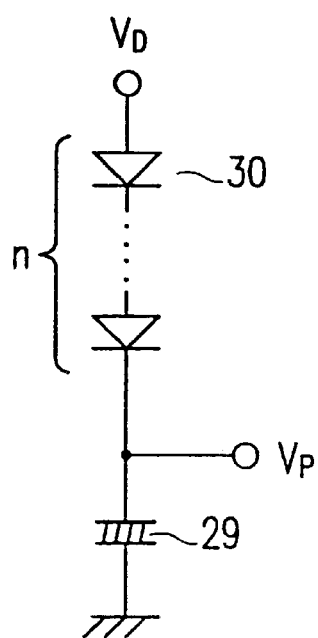

Each of FIGS. 4A and 4B is a circuit diagram showing an exemplary configuration of a voltage dividing circuit used in the active type solid-state imaging device according to the present invention.

Figure 5:
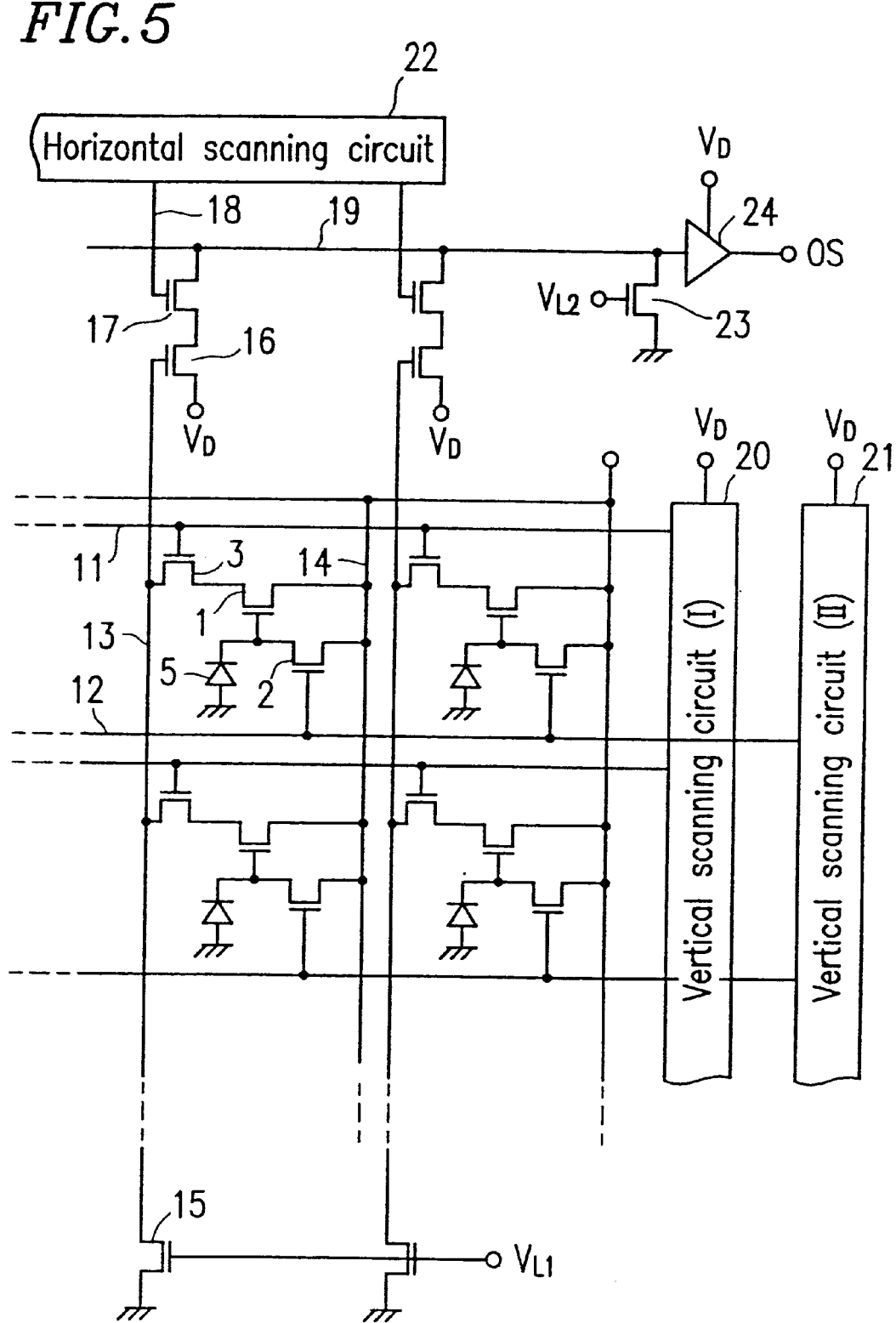

FIG. 5 is a circuit diagram showing an exemplary circuit configuration of a two dimensional area image sensor as a conventional active type solid-state imaging device.

Figure 6:
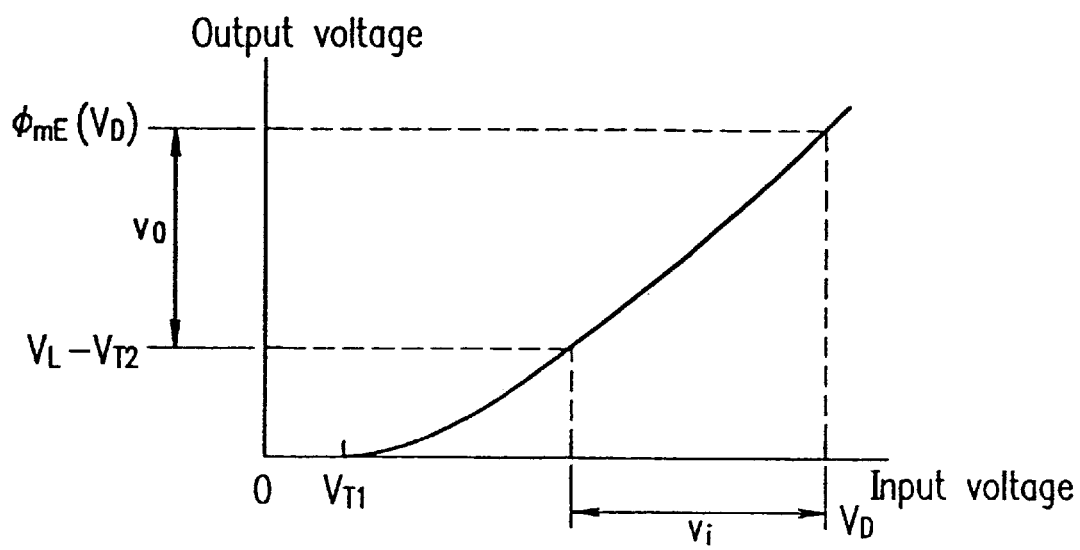

FIG. 6 is a graph illustrating an operation of the two dimensional area image sensor shown in FIG. 5.

Figure 7:
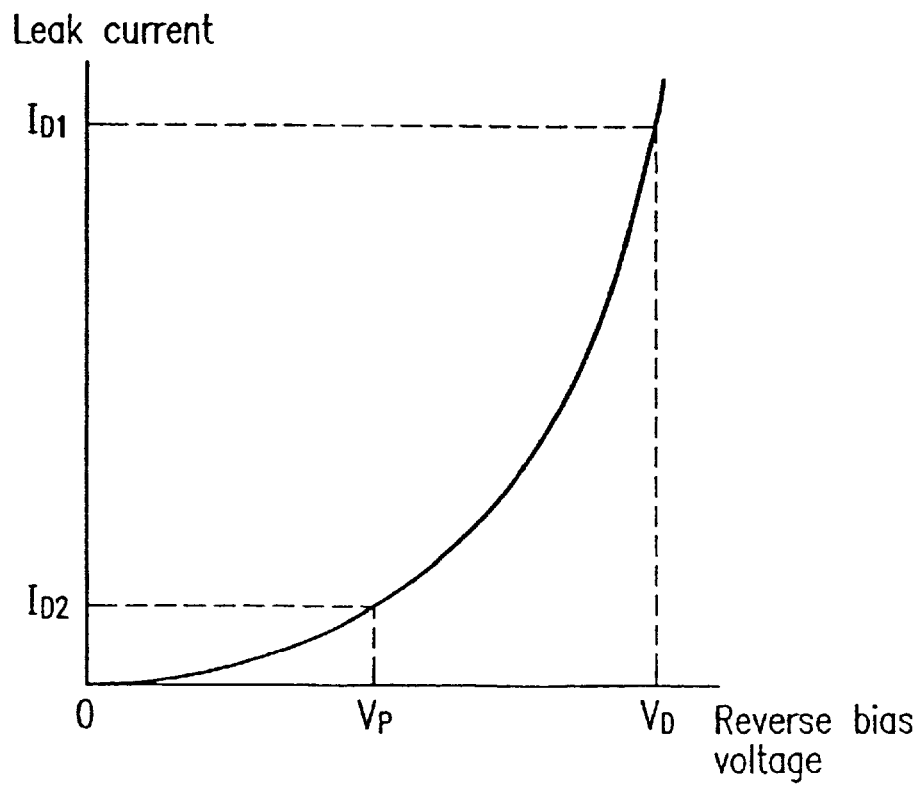

FIG. 7 is a diagram illustrating a problem of a conventional active type solid-state imaging device.

DESCRIPTION OF THE PREFERRED EMBODIMENTS

An embodiment of the present invention will now be described in more detail with reference to the drawings.

Figure 1:
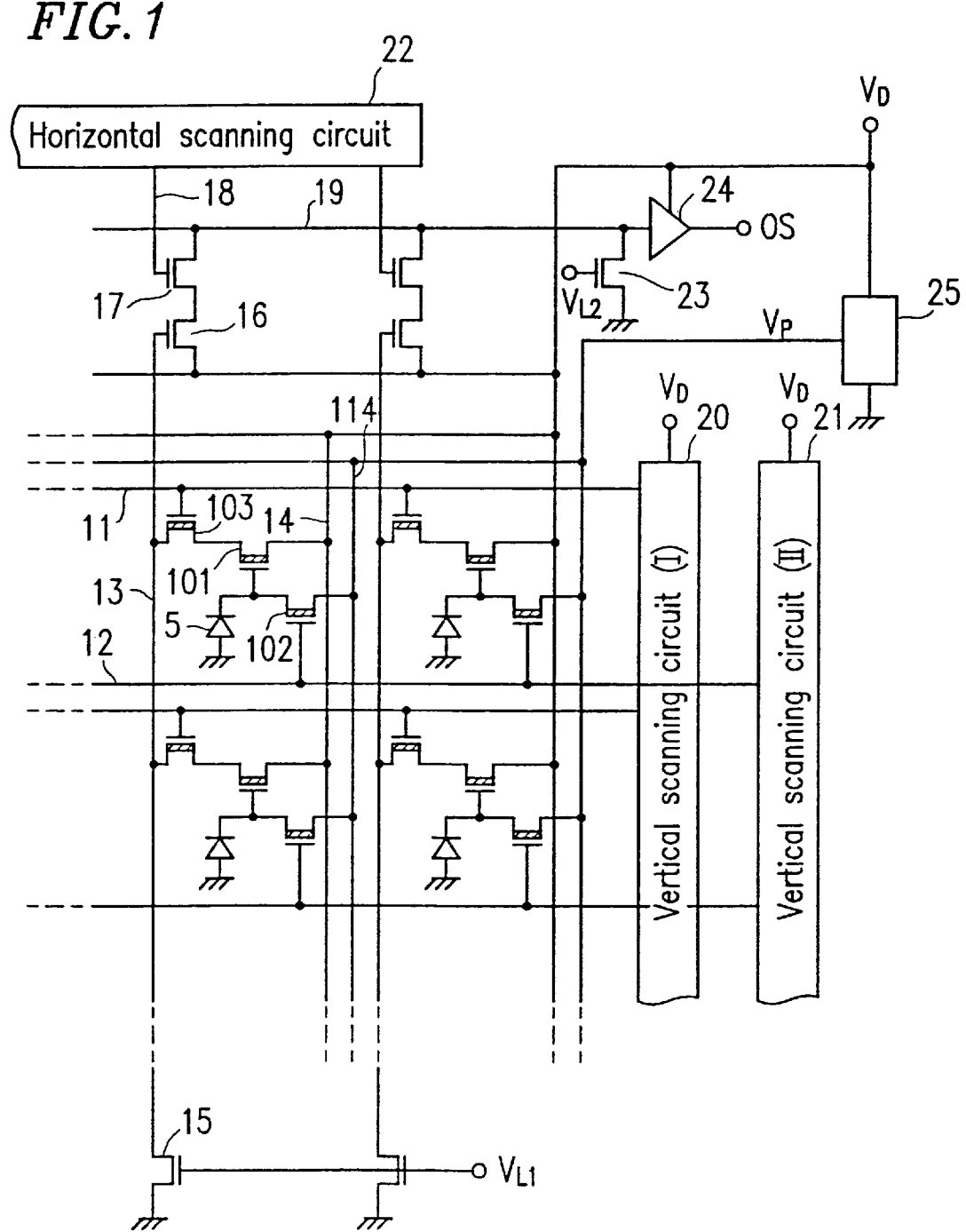
FIG. 1 is a circuit diagram showing an exemplary configuration of a two dimensional area image sensor as an embodiment of the active type solid-state imaging device according to the present invention.

FIG. 1 is a circuit diagram showing an exemplary configuration of a two dimensional area image sensor as an embodiment of the active type solid-state imaging device according to the present invention.

Referring to FIG. 1, the sensor includes a pixel selection clock line 11, a reset clock line 12, a signal line 13, and a power source line 14. These elements are similar to those of the conventional sensor shown in FIG. 5.

The distinct features of the present invention are as follows: a first, amplification MOS transistor 101, a second, reset MOS transistor 102, and a third, pixel selection MOS transistor 103 rare depletion type transistors; a reset power source line 114 is provided separately from the power source line 14 to which the signal-reading source voltage $V_D$ is applied; a voltage $V_P$ lower than $V_D$ is generated by a voltage dividing circuit 25 and applied to the reset power source line 114. In the example shown in FIG. 1, all the three MOS transistors 101, 102, and 103 are depletion type transistors in FIG. 1. However, under certain conditions, the reset MOS transistor 102 and the pixel selection MOS transistor 103 may alternatively be enhancement type transistors as in the conventional sensor.

In the example shown in FIG. 1, all the transistors 101, 102, and 103 are n-type depletion MOS transistors. Therefore, the source follower circuit, including the amplification MOS transistor 101 and the MOS transistor 15 as a load for supplying a constant current, will have an input/output characteristic as represented by the solid line in the graph of FIG. 2. Compared with the graph of FIG. 6, this graph shows that the input voltage range is shifted toward the negative side by $V_{T1}'-V_{T1}$ (where $V_{T1}$ denotes the threshold voltage of the enhancement type MOS transistor 101, and $V_{T1}'$ denotes the threshold voltage of a depletion type MOS transistor which is used in place of the enhancement type MOS transistor 101). In this case, as in the case shown in FIG. 6, for an output voltage v, within the range:

$$v_o > V_{L1} - V_{T2},$$

the MOS transistor 15 as a load for supplying a constant current is saturated, thus ensuring linearity of the input/output relationship (where $V_{T2}$ is the threshold voltage of the MOS transistor 15 as a load for supplying a constant current, and $V_{L1}$ is the gate bias voltage of the MOS transistor 15). Therefore, a sufficient operational margin can be obtained even when the input voltage $v_i$ is less than or equal to a voltage $V_P$ which is much lower than the source voltage $V_D$.

Accordingly, in the configuration in FIG. 1, the pn junction diode as the photoelectric conversion photo diode 5 is reset to the voltage $V_P$ which is much lower than the source voltage $V_D$, and the amount of leak current is greatly reduced as is apparent from FIG. 7. Therefore, the pn junction diode accumulates substantially no charge which may give a false signal. This means that the fixed-pattern noise in the displayed image due to the amount of leak current varying among different pixels and the white defect due to a localized leak current are considerably reduced. Thus, the image quality is greatly improved.

Figure 2:
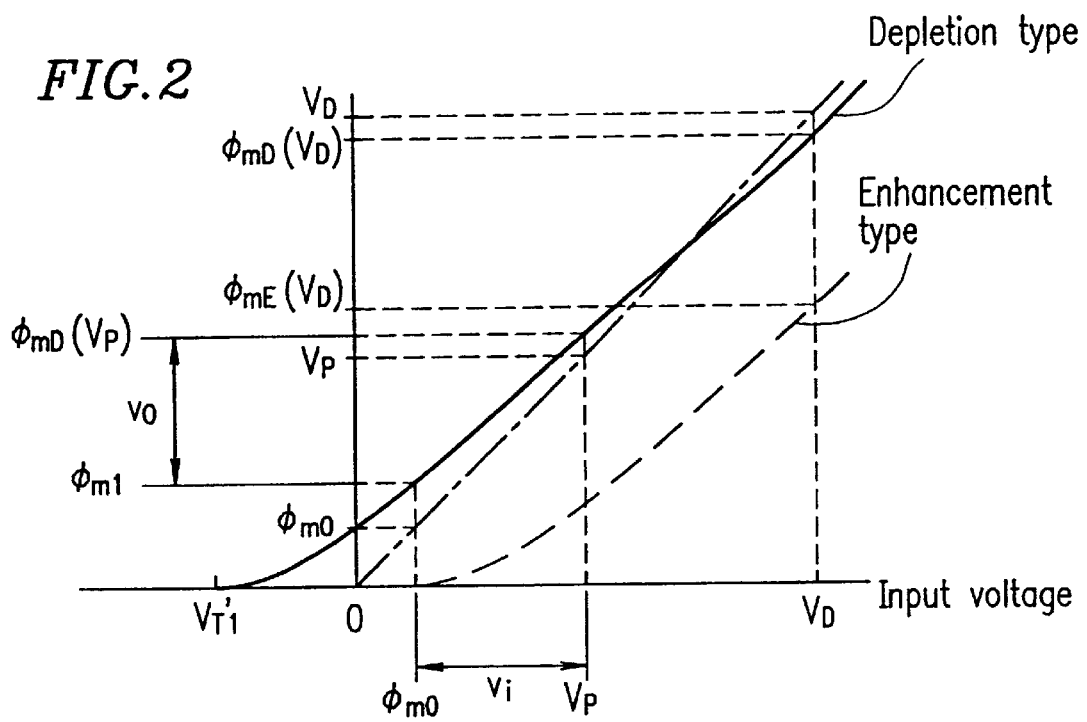
FIG. 2 is a graph illustrating an operation of the two dimensional area image sensor shown in FIG. 1.

In FIG. 1, the MOS transistors 102 and 103 are depletion type transistors as is the MOS transistor 101. Because the magnitude of the source voltage of the vertical scanning circuit (II) 21 is $V_D$, the high level of the reset clock of the reset clock line 12 which drives the MOS transistor 102 will be $V_D$. As shown in FIG. 2, when the gate voltage is $V_D$, the potential $\phi_{mD}(V_D)$ is:

$$\phi_{mD}(V_D) > V_P,$$

so that it is possible to reset the photo diode 5 to $V_P$ by the MOS transistor 102. Similarly, because the magnitude of the source voltage of the vertical scanning circuit (I) is also $V_D$, the high level of the selection clock of the pixel selection clock line 11 will be $V_D$. As shown in FIG. 2, $$\phi_{mD}(V_D) > \phi_{mD}(V_P).$$

Therefore, it is possible to switch the output voltage $\phi_{mD}(V_P)$ of the MOS transistor 101 by the MOS transistor 103. The range of the input voltage $V_i$ is, however, limited to:

$$\phi_{m0} < v_i < V_P,$$

due to the off margin of the MOS transistor 102. Herein, $\phi_{m0}$ is the channel potential of each of the MOS transistors 101 through 103 when their gate voltage is 0 V. As shown in FIG. 2, the potential $\phi_{m1}$ obtained when the gate voltage is $\phi_{m0}$ is:

$$\phi_{m1} > \phi_{m0},$$

so that the off margin of the MOS transistor 103 is ensured.

Figure 3:
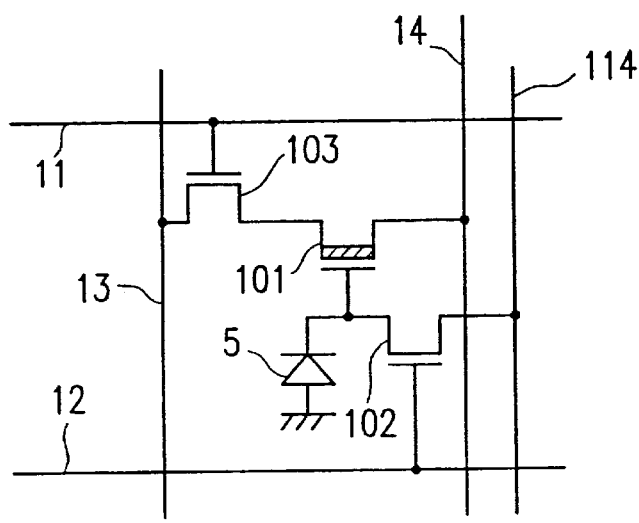
FIG. 3 is a circuit diagram showing an exemplary circuit configuration of a single pixel of the two dimensional area image sensor as another embodiment of the active type solid-state imaging device according to the present invention.

When the voltage difference between $V_D$ and $V_P$ is large, the device is operable even when the MOS transistors 102 and 103 are enhancement type transistors. FIG. 3 shows an exemplary pixel configuration in such a case. As shown in a broken line in FIG. 2, where the MOS transistors 102 and 103 are enhancement type transistors, if the relationship between the potential $\phi_{mE}(V_D)$ (the potential when the gate voltage is $V_D$) and the reset voltage $V_P$ is:

$$\phi_{mE}(V_d) > V_P,$$

it is possible to reset the photo diode 5 to $V_P$ by the MOS transistor 102. Where a depletion type transistor is used, if the relationship between the potential $\phi_{mE}(V_D)$ and the potential $\phi_{mD}(V_P)$ (the potential when the gate voltage is $V_P$) is:

$$\phi_{mE}(V_D) > \phi_{mD}(V_P),$$

it is possible to switch the output voltage $v_o \leq \phi_{mD}(V_P)$ of the MOS transistor 101 by the MOS transistor 103.

Because the MOS transistor 102 and 103 are of an enhancement type, and thus can be completely turned off, the range of the input voltage $v_i$ will not be limited by the off margin of the MOS transistors 102 and 103.

Each of FIGS. 4A and 4B shows an exemplary configuration of the voltage dividing circuit 25 shown in FIG. 1. In the configuration shown in FIG. 4A, a voltage is divided by resistors 26 and 27 and passed through a voltage follower circuit 28 having a low impedance. Then, the voltage is smoothed by a electrolytic capacitor 29 to be output as the voltage $V_P$. In the configuration shown in FIG. 4B, a number n of diodes 30 are serially connected to the voltage $V_D$ in the forward direction, and the output obtained through the diodes 30 is smoothed by the electrolytic capacitor 29. When the amount of potential lost in each diode 30 is $\Delta V$, the output voltage $V_P$ is:

$$V_P = V_D - n\Delta v.$$

As described above, an active type solid-state imaging device of the present invention includes: a plurality of pixels arranged in an array; a plurality of signal lines wherein each of the pixels is connected to one of the signal lines; a first power source; and a second power source having a lower voltage than that of the first power source. Each of the pixels includes: a photoelectric conversion section; a first, depletion type MOS transistor; a second, reset MOS transistor for resetting a signal charge which has been stored in the photoelectric conversion section: and a third, pixel selection MOS transistor serially connected to the first MOS transistor to form a transistor pair. One end of the transistor pair is connected to one of the signal lines and the other end thereof is connected to the first power source. One end of the second MOS transistor is connected to the photoelectric conversion section and the other end thereof is connected to the second power source.

In such an active type solid-state imaging device according to the present invention, the reverse bias voltage applied to the pn junction diode as a light detecting section is set to be lower than the source voltage which is necessary for signal reading operations. Therefore, the amount of leak current generated in the light detecting section is greatly reduced. Furthermore, according to the present invention, by using a depletion type transistor for a signal amplification MOS transistor, a sufficient operational margin is ensured even if the reverse biased voltage applied to the pn junction diode is low. Thus, the present invention provides advantageous and practical effects.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active type solid-state imaging device, comprising:
    a plurality of pixels arranged in an array;
    a plurality of signal lines wherein each of the pixels is connected to one of the signal lines;
    a first power source; and
    a second power source having a lower voltage than that of the first power source, each of the pixels comprising:
        a photoelectric conversion section;
        a second, reset MOS transistor for resetting a signal charge which has been stored in the photoelectric conversion section; and
        a third, pixel selection MOS transistor serially connected to the first MOS transistor to form a transistor pair, wherein:
            one end of the transistor pair is connected to one of the signal lines and the other end thereof is connected to the first power source; and
            one end of the second MOS transistor is connected to the photoelectric conversion section and the other end thereof is connected to the second power source; and wherein:
            the second MOS transistor and the third MOS transistor are of a depletion type.

2. An active solid-state imaging device according to claim 1, wherein each of the signal lines is connected o a signal processing circuit driven by the first power source.

3. An active solid-state imaging device according to claim 1, wherein the second power source comprises the first power source and a voltage dividing circuit for dividing the voltage of the first power source.

4. An active solid-state imaging device according to claim 3, wherein the voltage dividing circuit comprises a voltage follower circuit.

5. An active solid-state imaging device according to claim 3, wherein the voltage dividing circuit comprises a circuit having one or more diodes connected together in a forward direction.

* * * * *